INVENTOR
Franz Xavier Doll
BY
Michael J. Striker
ATTORNEY

Nov. 8, 1966    F. X. DOLL    3,283,597
STRUCTURE FOR TRANSMITTING ROTARY MOTION
THROUGH A HERMETICALLY SEALED SPACE
Filed July 9, 1964    5 Sheets-Sheet 2

INVENTOR
Franz Xaver Doll
BY
Michael S. Striker
ATTORNEY

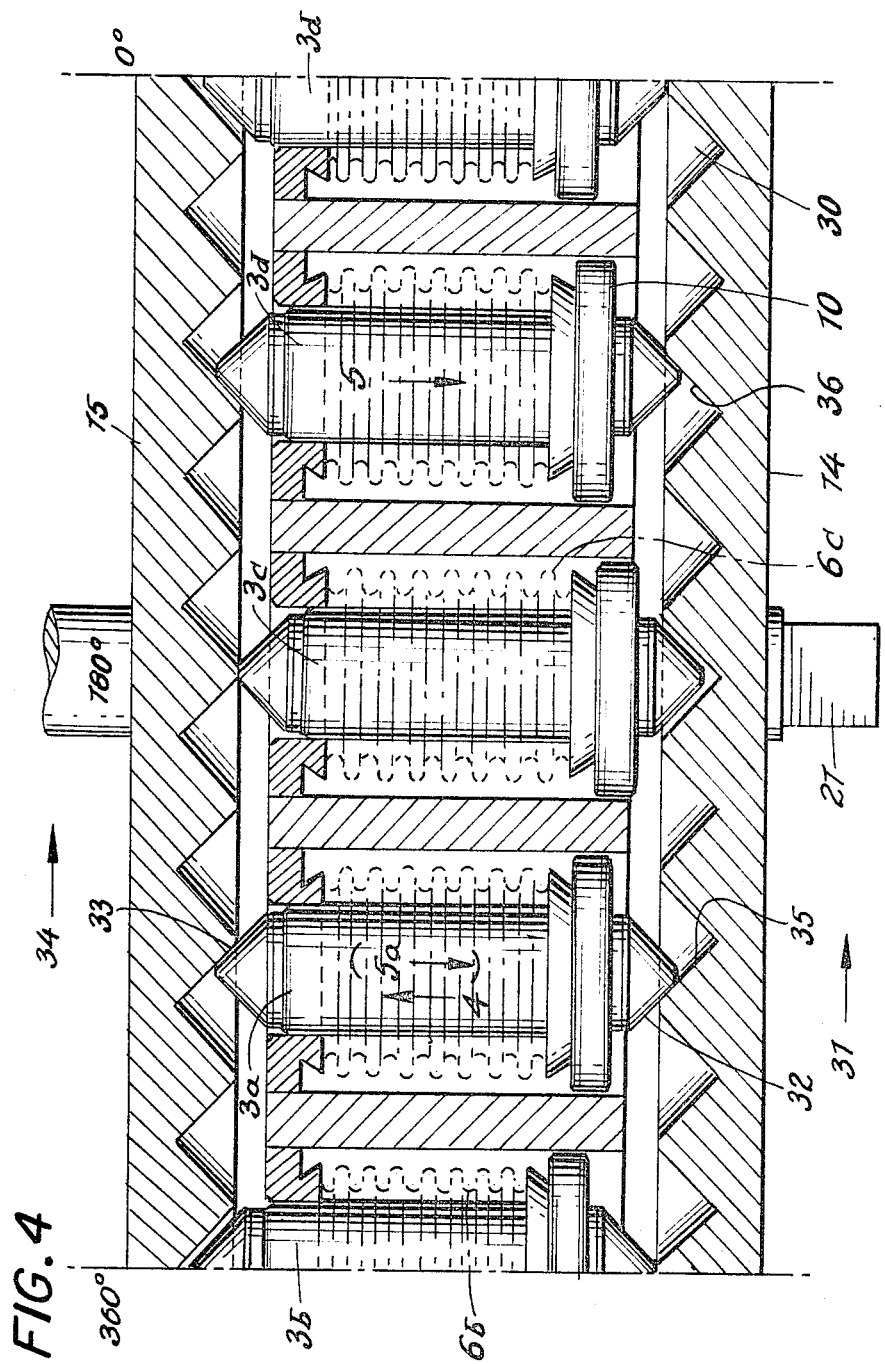

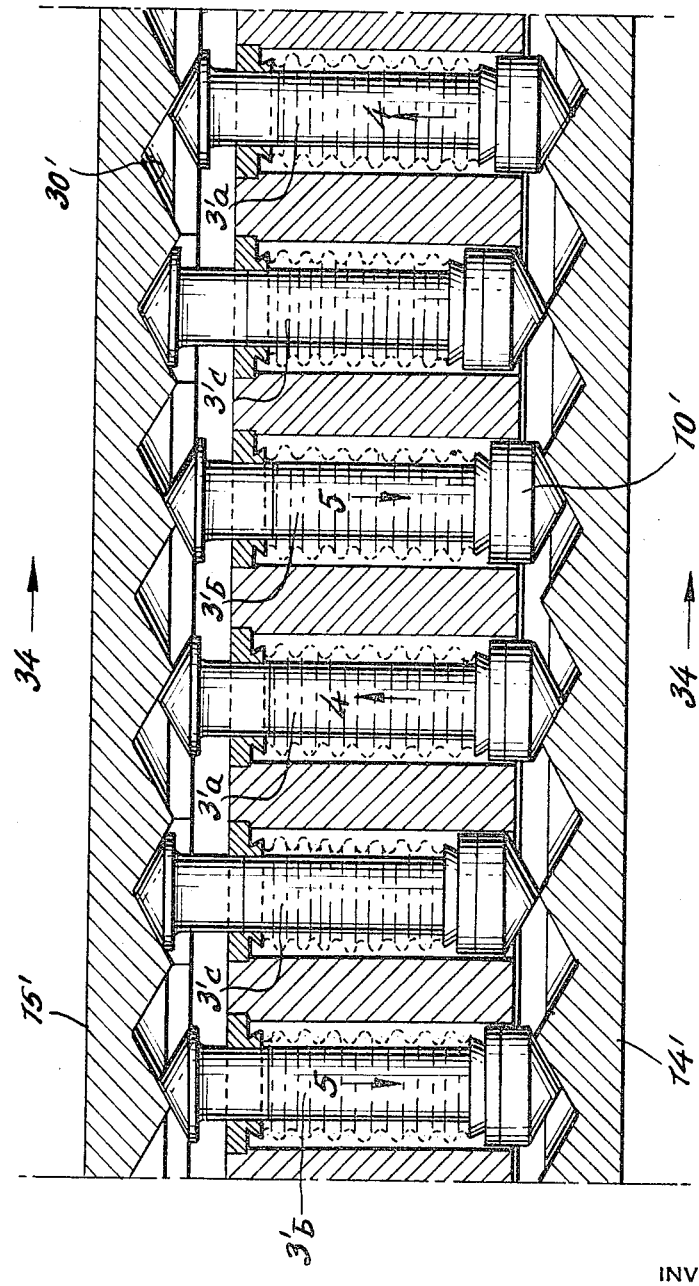

United States Patent Office 3,283,597
Patented Nov. 8, 1966

3,283,597
STRUCTURE FOR TRANSMITTING ROTARY MOTION THROUGH A HERMETICALLY SEALED SPACE
Franz Xavier Doll, Montreux-Territet, Switzerland, assignor to Industrie-Werke Karlsruhe, Karlsruhe, Germany
Filed July 9, 1964, Ser. No. 381,396
14 Claims. (Cl. 74—63)

The present invention relates to transmissions.

More particularly, the present invention relates to structures for transmitting rotary motion.

Although structures for transmitting rotary motion are of course very well known, particular problems are encountered when it is necessary to transmit rotary motion through a space which must be hermetically sealed.

In certain installations it is required to transmit rotary motion from the outside of a chamber which is tightly closed off from the outer atmosphere into the chamber so as to move certain elements within the sealed-off chamber, and while there are at the present time certain known structures capable of accomplishing this result, these known structures are extremely complex and expensive. In general where it is essential to transmit rotary motion into a chamber which is under a high vacuum or which is filled with an extremely dangerous gas, the problem of transmitting rotary motion into such a chamber has not yet been satisfactorily solved. In certain plants deal with atomic energy there are structures for transmitting motion through a wall into a chamber where dangerous radiation is present, but in these latter types of installations use is made of an extremely complex crank structure which uses a very large corrugated tubular structure which is required to carry out extremely complex wobbling movements, and because of its complexity and relatively low efficiency, the cost involved in such structures render them prohibitive for use throughout industry in general. Thus, in the petro-chemical industries as well as in certain plastic industries and coking plants structures of this latter type while they might be desirable cannot be used because of their high cost and because of their extremely large dimensions and low efficiencies.

It is therefore a primary object of the present invention to provide a relatively inexpensive structure which is capable of reliably transmitting rotary motion through a hermetically sealed space.

In particular, it is an object of the present invention to provide a structure of this type which is not only simple and inexpensive but which is also extremely compact so that it occupies only an extremely small amount of space.

Furthermore, it is an object of the present invention to provide a structure of this type which can be quickly and easily connected to a wall which defines part of a chamber which is to be sealed off from the outer atmosphere in such a way that there is complete reliability as to the sealing off of the chamber from the outer atmosphere when the structure of the invention is attached to this wall.

Furthermore, it is an object of the present invention to provide a structure of this type which will transmit rotary motion from the exterior to the interior of a chamber which is sealed off from the outer atmosphere with a considerably greater efficiency than has heretofore been attainable.

Still another object of the present invention is to provide a structure of this type which is capable of transmitting motion through a hermetically sealed space without relying on any structure for maintaining a seal between surfaces which move or slide with respect to each other so that there is absolutely no problem with respect to sealing glands such as stuffing boxes or the like which are required to provide a fluid-tight seal with respect to a sliding surface.

Furthermore, it is an object of the invention to provide a structure where there is a complete unbroken seal capable of being made up in its entirety of metal elements which are welded to each other while at the same time motion is transmitted through these elements so that there is a completely reliable seal maintained while at the same time the rotary motion can be transmitted through the sealing structure.

With the above objects in view the invention includes, in a structure for transmitting rotary motion through a hermetically sealed space, a fluid-impermeable body means which has opposed inner and outer ends and which is adapted to be fluid-tightly fixed at least at the region about its inner end to a wall, which defines at least part of a chamber which is hermetically sealed from the outer atmosphere, with this inner end of the fluid-impermeable body communicating through this wall with the interior of the latter chamber, and the body means of the invention is formed with a plurality of parallel bores which pass therethrough between the ends thereof and which are equidistantly spaced from and distributed about a predetermined axis which also passes through the body means between the inner and outer ends thereof and which is parallel to the bores. A plurality of plunger means are respectively situated in and extending through the bores and each has a pair of opposed substantially pointed ends. A plurality of guide means respectively guide a plurality of plunger means for axial movement in these bores. A driving ring is supported by the body means at the region of its outer end for rotation about the above-mentioned predetermined axis, and this driving ring has an annular surface which is directed toward the plurality of plunger means and which is formed with a plurality of recesses each of which is situated at the same distance from the predetermined axis as the bores, and these recesses have configurations which substantially match the substantially pointed end portions which are directed toward this driving ring. A driven ring is supported by the body means at the region of its inner end for rotation about the above-mentioned predetermined axis, and this driven ring also has an annular surface which is directed toward the plurality of plunger means and which is formed with a plurality of recesses each of which is situated also at the same distance from the predetermined axis as the bores of the body means, and these recesses of the driven ring have configurations which substantially match the substantially pointed end portions of the plunger means which are directed toward the driven ring. The distance between the annular surface of the driving ring at the parts thereof between the recesses thereof and the innermost parts of the recesses of the driven ring, on the one hand, and the distance between the above-mentioned annular surface of the driven ring at the parts thereof between the recesses of the driven ring and the innermost parts of the recesses of the driving ring, on the other hand, are at least as great as the total length of each of the plunger means, and the number of these recesses of each of the driving and driven rings has with respect to the number of the plunger means a relationship which provides at any instant during rotation of the driving ring axial movement of at least one plunger means from the driving ring toward the driven ring while the ends of this latter one plunger means are located simultaneously in one of the recesses of the driving ring and in one of the recesses of the driven ring, so that in this way the driven ring turns in response to axial movement of this one plunger means. At the instant when the part of the annular surface of the driving ring which is situated between the above-mentioned one recess thereof and the next adjoining recess thereof rides past this one plunger means, at least a second plunger means has its ends simultaneously situated in a second one of the recesses of the driving ring and a second one of the recesses of the driven ring and is axially advanced from the driving toward the driven ring so as to continue the rotation of the driven ring in response to rotation of the driving ring. A plurality of flexible, fluid-impermeable tubular means which are capable of contracting and expanding longitudinally are respectively situated in the bores of the body means surrounding the plurality of plunger means therein with one of the ends of this plurality of tubular means respectively fixed fluid-tightly to the plurality of plunger means and with the other of the ends of this plurality of tubular means respectively fixed fluid-tightly to the body means, so that the space which is occupied by the body means is hermetically sealed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 shows, however, the structure along the entire length thereof;

FIG. 4 is a sectional developed view of the structure of FIG. 1, the section of the development being taken along a cylinder which includes the axes of several reciprocating plungers of the invention;

Figure 6:
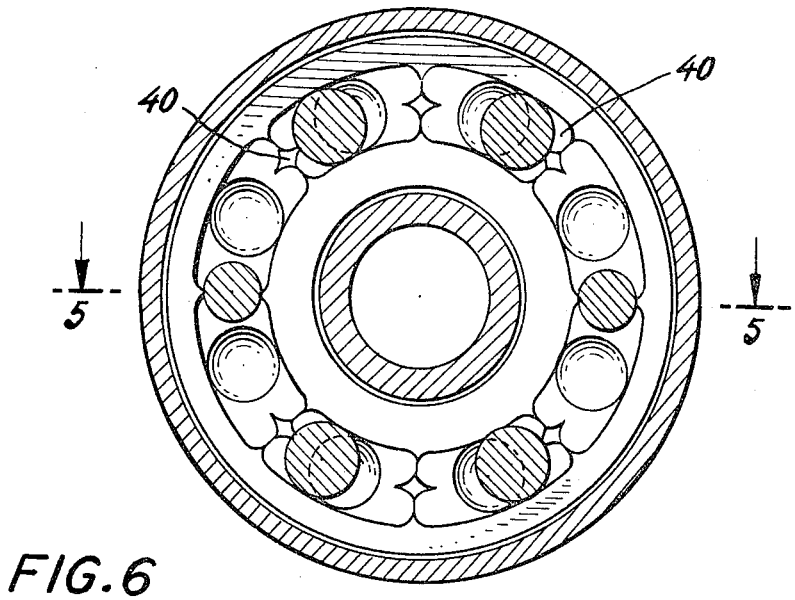
Figure 5:
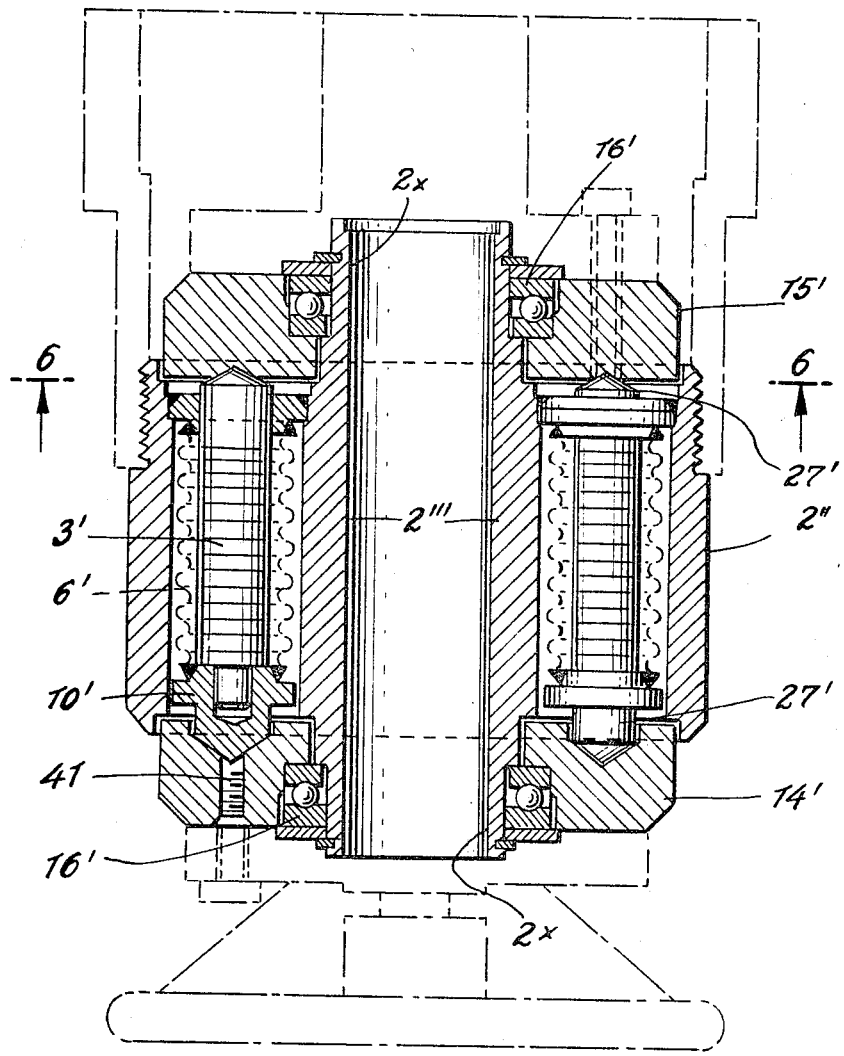
FIG. 5 is a longitudinal sectional illustration of yet another embodiment of a structure according to the invention, the section of FIG. 5 being taken along line 5—5 of FIG. 6 in the direction of the arrows and FIG. 5 illustrating the structure over the entire length thereof.

FIG. 6 is a sectional plan view of the structure of FIG. 5 taken along line 6—6 of FIG. 5 in the direction of the arrows; and FIG. 7 is a sectional development of the structure of FIGS. 5 and 6, the section of the development of FIG. 7 also being taken in a cylinder which includes the axes of the plungers of the embodiment of FIGS. 5 and 6.

Figures 1, 2:
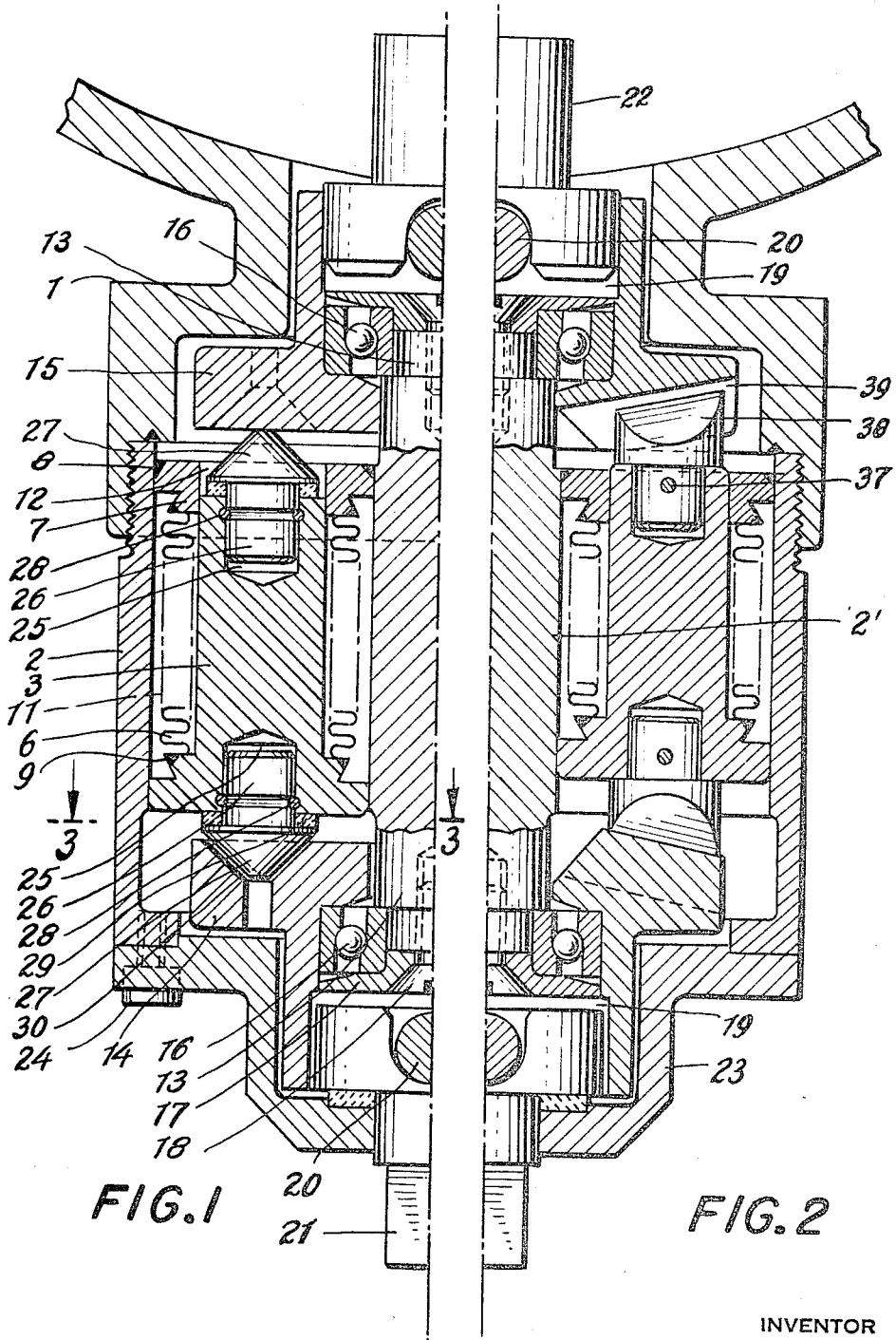
FIG. 1 is a fragmentary longitudinal sectional illustration of one possible embodiment of a structure according to the present invention, the section of FIG. 1 being taken along line 1—1 of FIG. 2 in the direction of the arrows
FIG. 2 is a longitudinal sectional view, similar to the view of FIG. 1, of a different embodiment of a structure according to the present invention.
Figure 3:
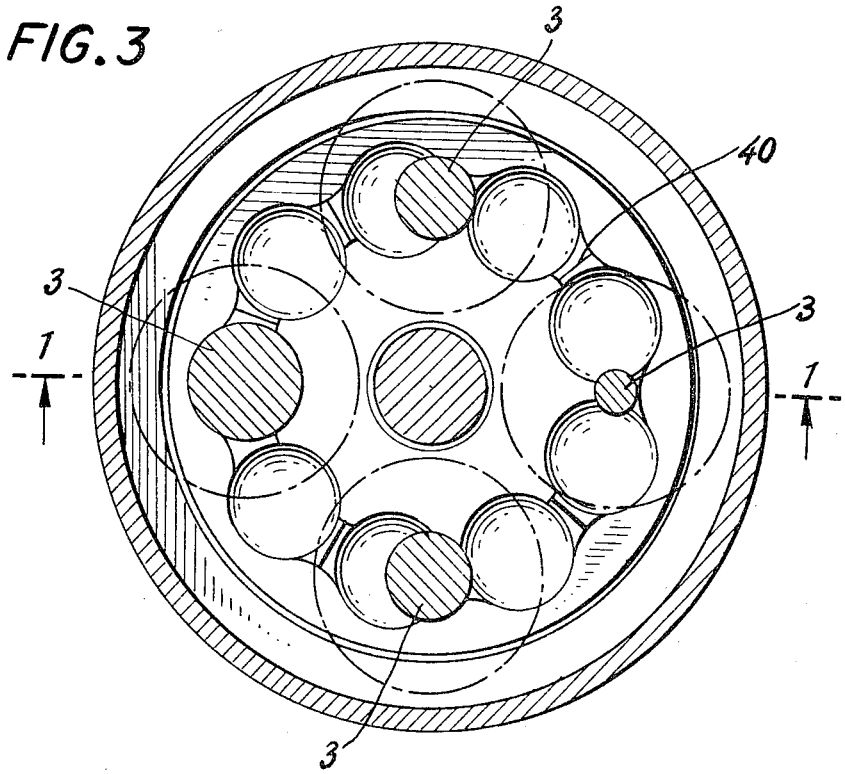
FIG. 3 is a sectional plan view taken along line 3—3 of FIG. 1 in the direction of the arrows but showing the structure across the entire area thereof.

Referring now to FIGS. 1, 3, and 4, it will be seen that the structure of the invention includes a body means 2 which is fluid-tightly impermeable, and in the actual structure shown this body means 2 is made of a suitable metal. It carries a mounting means by which it is capable of being mounted on a wall 1 which forms part of a chamber which is to be sealed off from the outer atmosphere, and in the illustrated example this mounting means takes the form of a threaded portion of the body means 2 which is fluid-tightly threaded to the elongated open portion of the wall 1 which is visible in FIG. 1. This body means 2 has inner and outer ends, and it is in the region of its inner end that the body means 2 is fluid-tightly fixed to the wall 1. The body means 2 is formed about its longitudinal central axis with four bores which are parallel to and equidistant from as well as uniformly distributed about the longitudinal central axis of the body means 2, and four plunger means 3 according to the present invention are respectively situated in these bores, the distribution of these four plunger means about the axis of the body means 2 being particularly apparent from FIG. 3.

As is apparent particularly from FIG. 1, each of the plunger means 3 has a diameter smaller than the bore 11 of the body means 2 in which it is situated, and an elongated flexible fluid-tight tubular means 6 which is capable of longitudinally expanding and contracting surrounds each plunger means 3 in the bore 11 in which it situated. This fluid-impermeable tubular means 6 takes the form of an elongated corrugated metal tube which is capable of expanding and contracting longitudinally due to the yieldability of the annular corrugations thereof. Furthemore, there is situated in each of the bores 11 of the body means 2 a guide means for guiding the plunger means 3 for axial movement, and in the illustrated example this guide means includes a ring 7 situated in each bore 11 and surrounding the plunger means 3 so as to slidably engage the latter and thus guide it for longitudinal movement, the guide means further including an outwardly directed flange 10 of each plunger means 3 which at its outer periphery slidably engages the body means 2 in the bore 11 thereof in which the plunger means 3 is situated. Thus, the cooperation of the flange 10 with the body means and the guide ring 7 with the plunger means to guide the latter for precise axial movement back and forth as indicated by the arrows 4 and 5 in FIG. 4.

A perfectly tight seal is provided through the space space which is occupied by the body means 2 by, on the one hand, welding each guide ring 7 about its entire periphery to the body means 2 and in addition welding the ring 7 in each bore 11 to one end of the tubular means 6 therein, and on the other hand by welding the other end of the tubular means 6 to the plunger means 3 in the region of the flange 10 thereof, so that in this way the tubular means 6 is at one end connected through weldments to the body means 2 and at its opposite end by a weldment to the plunger means 3, and since the plunger means 3, the body means 2, the tubular means 6, and all of the weldments or other elements which interconnect these parts are made of metal, it is clear that a perfectly tight assembly is provided and no fluid can possibly escape through the body means 2 although the plungers 3 are of course capable of reciprocating axially in the bores of the body means 2. The ring 7 which is fixed to the body means 2 by the annular weldment 8 in effect forms an integral part of the body means 2, and the tubular means 6 is fluid-tightly fixed by a weldment 9 to the plunger means 3 in the region of its flange 10.

The body means 2 has a central portion 2' which is extended at the inner and outer ends of the body means 2 so as to provide the latter with pins 13 at the inner and outer ends. The pin 13 at the outer end of the body means 2 supports for rotary movement a driving ring 14, and for this purpose the outer pin 13 carries a ball bearing assembly 16 which mounts the driving ring 14 on the body means 2 for rotary movement about the central axis thereof. A driven ring 15 is mounted on the pin 13 at the inner end of the body means 2, and this driven ring 15 is also supported for rotation by a second ball bearing assembly 16, and it will be noted that the inner end of the body means 2 as well as the driven ring 15 communicate with the interior of the space part of which is defined by the wall 1. A plate 17 is threaded to the pin 13 at the outer end of the body means 2 by a screw 18 so as to retain the ball bearing assembly 16 at the outer end of the assembly on the pin 13, and a similar plate 17 and screw 18 are provided at the pin 13 of the inner end of the body means 2 for retaining the inner ball bearing assembly 16 assembled with the remainder of the structure.

The driving ring 14 has an inner annular surface in a plane normal to the axis of the body means 2 and directed toward the plunger means 3, and this inner annular surface is formed with a plurality of substantially conical recesses 30 which are located at the same distance from the axis of the body means 2 as the plurality of plunger means 3, but the number of recesses 30 is greater than the number of plunger means 3. The driven ring 15 is formed at its inner annular surface which is directed toward the plunger means 3 also with a pluraity of recesses 30 the number and configuration and arrangement of which may be identical with the recesses 30 of the driving ring 14.

The driving and driven rings 14 and 15 are provided with central tubular extensions 19 which are directed away from the plunger means, and each of these central tubular extensions, which are open at their outer ends, carries a cross pin 20 which is fixed to the ring, so that in this way a cross pin 20 is fixed to the driving ring 14 and a second cross pin 20 is fixed to the driven ring 15.

A drive shaft 21 has an enlarged end situated in the tubular central portion of the driving ring 14, and this enlarged end of the drive shaft 21 is formed with a transverse groove which receives the cross pin 20 so that when the drive shaft 21 is rotated, either manually or through a suitable drive, the driving ring 14 will rotate about the axis of the body means 2. In the same way a driven shaft 22 has an enlarged end situated in the tubular portion 19 of the driven ring 15 and formed with a transverse groove which receives the pin 20 so that when the latter pin turns it will turn the driven shaft 22. At its outer end the body means 2 carries a protective cover 23 which is threaded, for example, to the body means 2 by the screws 24 and which is formed with a central aperture through which the shaft 21 projects, as is apparent from FIG. 1.

The structure of FIG. 1 is a preferred embodiment of the invention which is to be used for installations where only occasional operation of the structure is required. For example the structure of FIG. 1 is preferred for those cases where it is necessary to operate a valve of any type from the exterior while maintaining the interior of the valve housing and of course all of the structure with which the valve housing communicates fluid-tightly closed off from the outer atmosphere. In such cases the shaft 21 would of course be manually turned only when an adjustment of the valve is required, and thus this particular construction is preferred for these installations where continuous operation is not essential. For installations of this type the surface engagement between the elements which is provided with the embodiment of FIG. 1 suffices.

Each plunger means 3 has opposed substantially pointed ends the configurations of which substantially match the configurations of the recesses 30. The term "pointed ends" as used in this specification and the claims which follow is intended to cover tapering or wedge-shaped as well as curved structures which need not necessarily have a sharp end since the ends can be quite blunt, but this term is used to refer to cones, pyramids, wedges, hemispheres, and any substantially pointed configuration where the cross section of the end portion diminishes toward the extremity thereof. In the illustrated example of course the substantially pointed end portions 27 of the plunger means 3 are of a conical or substantially conical configuration matching that of the recesses 30. Moreover, these end portions 27 are formed as elements independent and separate from the remainder of the plunger means 3, and the plunger means 3 is formed with a pair of axial bores 25 which respectively receive cylindrical neck portions 26 of the conical end portions 27, these necks 26 being freely turnable within the bores 25, and snap rings 28 are seated partly in grooves of the plunger body and partly in grooves of the necks 26 so as to retain the conical end portions 27 assembled with the plunger body while at the same time permitting free rotary movement of the end portions 27, and in order to reduce the friction washers 29 of low coefficients of friction are situated between the conical end portions 27 and the end faces of the body portion of the plunger means 3 to which the end portions 27 thereof are connected.

As is apparent particularly from FIGS. 3 and 4, the section of the development of FIG. 4 being taken along the cylinder which includes the axes of the plurality of plunger means 3, there are in the illustrated example four plunger means and nine recesses 30 in each of the rings 14 and 15.

In order to turn the driving ring 14, the outer end of the drive shaft 21 can be of a non-circular cross section such as a square cross section to which a crank, handle, or the like can be connected so that the operator can manually turn the shaft 21, and when the shaft is turned the drive ring 14 will turn therewith, and in the developed illustration of FIG. 4 the drive ring 14 is shown turning in the direction of the arrow 31. It will be seen that at the particular instant of operation which is illustrated in FIG. 4 motion is transmitted from the drive ring 14 to the driven ring 15 by the plunger means 3a which advances in the direction of the arrow 4 from the drive ring 14 to the driven ring 15. At this time the opposed ends of the plunger means 3a are simultaneously situated in recesses of the driving and driven rings 14 and 15, and it will be seen that the surface 35 of the recess 30 of ring 14 which receives the end of the plunger means 3a applies a force 32 on the plunger means 3a so as to advance it in the direction of the arrow 4, and as a result the other end of the plunger means 3a will engage the driven ring 15 at 33 so as to turn the driven ring 15 in the direction of the arrow 34 while the plunger means 3a continues to advance axially in the direction of the arrow 4. Although the recesses 30 of the driven ring 15 are not axially aligned with the recesses 30 of the driving ring 14, nevertheless it will be seen that with this structure the driven ring 15 turns in complete synchronism with and at the same angular speed as and in the same direction of rotation as the driving ring 14.

Thus, at the instant of operation which is illustrated in FIG. 4 it is the plunger means 3a which transmits, as a result of this axial movement, the rotary motion of the driving ring 14 to the driven ring 15 so as to turn the latter. The plunger means 3b at this instant is at a neutral position where the end thereof directed toward the driving ring 14 engages a surface portion thereof between a pair of adjoining recesses 30 so that the inner annular surface of the driving ring 14 at this instant is riding past the end of the plunger means 3b which is directed toward the driving ring 14, and it will be noted that at this moment the axis of the plunger means 3b coincides with the axis or center of the recess 30 of the driven ring 15 which receives the end of the plunger means 3b which is directed toward the driven ring 15. Furthermore, it is apparent that the distance between the inner annular surface of the driving ring 14 and the innermost parts of the recesses of the driven ring 15, on the one hand, and the distance between the inner annular surface of the driven ring 15 and the innermost parts of the recesses 30 of the driving ring 14, on the other hand, must be at least as great as the total length of each of the plunger means. At the moment of operation which is illustrated in FIG. 4 the plunger means 3b has just completed the transmission of the rotary movement of the driving ring 14 to the driven ring 15, and at the instant when the inner annular surface of the driving ring 14 engages the extremity of the plunger means 3b the plunger means 3a is in a position, which is to say the rings 14 and 15 have reached with respect to the plunger means 3a an angular position which enables the plunger means 3a to take over the transmission of the rotary motion from the driving to the driven ring at the precise moment when the transmission of the rotary motion by the plunger means 3b has terminated. It will be seen that the plunger means 3c has a position with respect to the rings 15 and 14 which is precisely the same as the position of the plunger means 3b with respect to the rings 14 and 15, or in other words the plunger means 3b and 3c are at their opposite extremes of axial displacement.

This plunger means 3c is in a position where it will be engaged by the driving ring 14 to continue the transmission of the rotary motion when the rotary motion is no longer transmitted by the plunger means 3a when the latter has reached the same axial position as the plunger means 3b. Moreover it will be noted that the plunger means 3d at this time is being advanced in the direction of the arrow 5 toward the extreme axial position in which the plunger means 3c is located, so that when the transmission of the rotary motion by the plunger means 3c terminates the plunger means 3d will be in an axial position enabling it to continue the transmission of rotary motion from the ring 14 to the ring 15. Thus, it will be seen that with the structure of the invention although the plurality of plunger means move only axially nevertheless the number of recesses of the driving and driven rings has with respect to the number of plunger means a relationship which will guarantee that at any instant there is always at least one plunger means in a position for transmitting rotary motion from the driving to the driven ring while the instant when this latter plunger means can no longer transmit such rotary motion a second plunger means has arrived at a position where it can continue the rotary motion transmission from the driving to the driven ring.

When each of the plunger means reaches the axial end position in which the plunger means 3b is located in FIG. 4, the flexible tubular means 6, which is the flexible tubular means 6b in FIG. 4, has been compressed to its shortest length, and therefore during the return of the plunger means to its opposite end position not only will the action of the ring 15 on the plunger means produce the return movement, as shown for the plunger means 3d in FIG. 4, but in addition the springly force of the compressed tubular means will also contribute to this movement so that the springy force of the tubular means augments the action of the driven ring 15 in returning each of the plunger means to the intial position thereof illustrated for the plunger means 3c in FIG. 4. Although the compressed tubular means contributes to the movement of the plunger means which happens to be in the position of the plunger means 3b back toward the position of the plunger means 3c, this augmenting of the return movement by the spring force of the corrugated metallic tubular means 6 is effective only part of the return movement, and during the final portion of the return movement the tubular means is tensioned, so that when each plunger means arrives at the axial position shown for the plunger means 3c in FIG. 4 the tubular means 6, as is the case for the tubular means 6c of FIG. 4, has been stretched to its longest length, and therefore the force of the tubular means will contribute to the transmission of the rotation from the driving to the driven ring during initial movement of each plunger means toward the driven ring 15.

Furthermore, although it is essential that at the instant when one plunger means reaches its end position there should be a second plunger means in a position to continue the transmission of rotation, in the illustrated example during the final portion of the transmission of rotation by the plunger means 3a the driving ring 14 will have already engaged the plunger means 3c and will have started the axial movement thereof in the direction of the arrow 4 toward the driven ring 15, so that in the actual construction there is an overlap in the operation of the plurality of plunger means according to which the final portion of the transmission by one plunger means and the initial portion of the transmission by the second plunger means will take place simultaneously, and as a result of this feature it becomes unnecessary to construct the components with the degree of precision which would be required for the second plunger means to take over the transmission at the instant when the transmission is terminated by the first plunger means.

It is to be noted that while the plunger means 3a advances in the direction of the arrow 4 and the plunger means 3d advances in the opposite direction shown by the arrow 5, if there should be in the interior chamber defined in part by the wall 1 a relatively high pressure, this high pressure will act on the plunger means 3a and 3d so as to urge the plunger means 3d in the direction of the arrow 5 and simultaneously urge the plunger means 3a in the direction of the arrow 5a. In this way under conditions where the structure is exposed to a high pressure the plunger means of the invention simultaneously applies directly opposed forces on the driving ring 14. In other words at the instant of operation shown in FIG. 4 a high pressure in the interior of the chamber which is defined by the wall 1 would press the plunger means 3d against the surface 36 and the plunger means 3a against the surface 35 of the driving ring 14, and the same would be true of the other plunger means during the subsequent operation, so that under conditions of operation at high pressure the structure of the invention provides at directly opposed parts of the driving ring forces which because they substantially balance each other have no influence on the turning force which is applied to the shaft 21. The only result of such forces is that the pair of plunger means, which happens to be the plunger means 3a and 3d in the position of the parts shown in FIG. 4, press with a greater force against the driving ring 14. In the event that the interior of the chamber which is sealed off from the outer atmosphere is under a vacuum, then of course the opposite effect is produced and the specific pressure with which the plurality of plunger means engage the surface of the driven ring 15 will be increased, but here again these pressures will be balanced so that there will be no undesirable influence on the required turning moments.

It is furthermore apparent that in the particular embodiment of FIGS. 1, 3 and 4, the even number of plunger means and the odd number of recesses 30 in each of the rings 14 and 15 provides a displacement angularly of the rings 14 and 15 with respect to each other which is precisely equal to one half the angular distance between a pair of successive recesses. Also, if the direction of rotation of the driving ring 14 should be reversed it is clear that the above-described operation will also take place, the plunger means still advancing from the driving to the driven ring during transmission of rotation but in this case it would be the opposite sides of the recesses 30 of the ring 14 which engage the plurality of plunger means and the opposite sides of the recesses of the driven ring 15 which engage the plurality of plunger means.

The mountin of the conical end portions 27 for free rotary movement with respect to the remainder of each plunger means reduces the wear on the parts because during operation when a pair of conical end portions 27 of a given plunger means simultaneously engage the driving and and driven rings this pair of conical end portions will be free to turn simultaneously in opposite directions with respect to the plunger means. Although the particular embodiment is designed to operate only periodically and has relatively small areas of contact between the plunger means and the driving and driven rings, nevertheless this wear-reducing expedient has proved to be worthwhile.

In the embodiment of the invention which is illustrated in FIGS. 5-7, the body means 2" has an axially bored central portion 2'" for the purpose of accommodating a slide valve actuated by a threaded spindle in a manner well known in the art, this valve being, for example a gate valve, and the central portion 2'" of the body means 2" has at its inner and outer ends the projecting portions 2x which serve to mount the ball bearing assemblies 16'. In this case also the body means is formed with a plurality of axial bores passing through the body means from its inner to its outer end and extending parallel to and uniformly distributed about and equidistant from the central axis of the body means, and these bores respectively receive the plurality of plunger means 3' which are provided at their opposed ends with the conical end portions 27'. In this case however the conical end portions 27' are hollow and receive in axial bores pins projecting from the body portion of the plunger means 3', as shown particularly at the left portion of FIG. 5, and the plurality of end portions 27 which are directed toward the driving ring 14' are provided with the outwardly directed flanges 10' which form part of the guide means for the plunger means as described above for the flanges 10. The plurality of corrugated metal tubular means 6' are mounted in the same way as in the embodiment of FIG. 1 in the several bores respectively surrounding the plunger means therein, and the opposed ends of each tubular means 6' are respectively welded on the one hand to the plunger means and on the other hand to the body means, in this case also through a guide ring which is itself welded directly to the body means, so that the same hermetic seal in the space occupied by the body means is achieved with the embodiment of FIGS. 5–7. The remaining components are constructed in the manner similar to that described above for the embodiment of FIGS. 1, 3 and 4.

Moreover, the principle of operation is the same. However, in the embodiment of FIGS. 5–7 the number of plunger means 3' is even and the number of recesses in each of the driving and driven rings 14' and 15' is also even. As may be seen from the developed view of FIG. 7, in this case there are six plunger means 3' and eight recesses 30' formed in each of the rings 14' and 15'. In this embodiment a precise symmetry of the assembly is provided so that free turnability of the driving or driven rings as when changing from one direction of rotation to the other is avoided. Of course, this relationship can be changed in any desired manner.

FIG. 7 shows how with this symmetrical arrangement a pair of plunger means are always in precisely the same positions. The driving ring 14' is assumed to be turning in the direction of the arrow 31, and the driven ring 15' is driven in the direction of the arrow 34 in synchronism with the driving ring 14'. At the instant of operation shown in FIG. 7 the pair of plunger means 3'a are transmitting the rotary movement from the driving to the driven ring, and it will be noted that at this time both of these plunger means are advanced in the direction of the arrow 4 from the driving toward the driven ring. The pair of plunger means 3'b are moving back toward the driving ring 14' in the direction of the arrows 5, while the pair of plunger means 3'c have just reached the end of their movement in the direction of the arrow 4 and are about to move in the reverse direction shown by the arrows 5. With the plunger means 3'a the tubular means 6' are stretched while at the pair of plunger means 3'c the tubular means 6' are compressed.

It is to be noted that the pair of plungers 3'c of FIG. 7 are shown at the instant when they have just terminated transmission of rotation from the driving ring 14' to the driven ring 15', and at this moment the ends of the pair of plunger means 3'a extend substantially into recesses 30' of the driving and driven rings, so that before the plunger means 3'c have reached their axial end position shown in FIG. 7 the transmission was already transmitted in part by the plunger means 3'a, so that with this embodiment also there is an overlap where two pairs of plunger means will both simultaneously transmit motion before the transmission by one pair terminates and the transmission is continued only by the other pair, and thus with this embodiment also the extreme precision which would be required by terminating transmission from one plunger means at the moment when the transmission starts by the second plunger means is reliably avoided. Furthermore, it is clearly apparent that with the embodiment of FIG. 7 the arrangement of a pair of plunger means to operate simultaneously serves to distribute the load very effectively among the plurality of plunger means, but at the same time it is clear from FIG. 7 that the structure of the invention will operate with only three plunger means since with the structure shown in FIG. 7 it is clear that one of each of the pairs of plunger means which are identically positioned could be omitted and the structure would still operate.

The embodiment of the invention which is illustrated in FIG. 2 is substantially the same as that of FIG. 1 and operates in the very same way, except for the differences noted below. Thus, with this embodiment of FIG. 2 the only distinction over the embodiment of FIG. 1 resides in the fact that instead of providing freely rotatable conical end portions 27, each plunger means 3 of the embodiment of FIG. 2 has a pair of opposed fixed end portions 38. These end portions 38 are of a wedge-shaped configuration, in that they are formed by oppositely directed and oppositely inclined surfaces which join each other at an inclined edge at the outermost extremity at each end of each plunger means, and these oppositely inclined surfaces provide each end portion 38 of the plunger means with a substantially V-shaped cross sectional configuration. The necks of the end portions 38 extend into bores in the body of the plunger means and cross pins 37 extend through the necks and into suitable bores of the body of the plunger means so that in this way the end portions 38 are rigidly fixed to the plunger means with the embodiment of FIG. 2.

During the operation of this embodiment it is true that there will be moments tending to turn the pair of end portions 38 of each plunger means with respect to the remainder thereof, but inasmuch as these turning moments act in directly opposed directions, it is clear that the turning moments cancel each other out so that there is no tendency to turn the body of the plunger means. However, this tendency of the end portions 38 of a given plunger means to simultaneously turn in opposite directions will provide an additional pressure of the end portions of the plunger means against the pair of rings 14 and 15. However, this factor is not of any significance inasmuch as the areas of contact between the plunger means and the driving rings of the embodiment of FIG. 2 is much greater than in the case where the end portions of the plunger means are of a conical configuration. It is to be noted that the driving and driven rings are formed with V-shaped recesses 39 which are also inclined with respect to the axis in the same way as the end edges of the wedge-shaped portions 38 of the plunger means, so that the driving and driven rings of this embodiment have a construction very similar to that of a pair of bevel gears and they cooperate with the plurality of plunger means in a manner similar to a bevel gear transmission. Assuming that the embodiment of FIG. 2 has the same outer dimensions as the embodiment of FIG. 1 or the embodiment of FIG. 5, for example, the greater areas of contact between the plunger means of the embodiment of FIG. 2 with the driving and driven rings, as compared to the areas of the contact between the plunger means and rings of the other embodiments, enables the embodiment of FIG. 2 to transmit more power.

A further method of increasing the transmission of power is to increase the number of plunger means, while maintaining the initial sizes of the plurality of plunger means. As may be seen from FIG. 3, the circle shown in dot-dash lines of FIG. 3 is part of a cylinder which includes the axes of the several plunger means, and it would be necessary with an increase in the number of the plunger means under these conditions to increase the diameter of this cylinder so that the axes of the several plunger means would be located at a greater distance from the axis of the body means, as would be necessary to achieve a necessary amount of space for the greater number of plunger means. As a result it follows that since the distance between the central axis of the body means and each of the plunger means is increased the lever arm which transmits the rotary movement is also increased, and on the other hand the overlap in the sequences of the operations of the several plunger means would also be increased so that the working contact areas through which the transmission is provided would correspondingly increase, so that while maintaining the length of the entire assembly the same it is possible simply by increasing its diameter to accommodate a larger number of plunger means and thus increase the amount of power which can be transmitted.

It is completely unnecessary to provide the structure of the invention with any special mounting structure inasmuch as it is directly flanged onto or threaded onto the wall which defines part of the chamber which is to be sealed off from the outer atmosphere. The pins which project from the inner and outer ends of the body means so as to support the bearings 16 or 16' serve to align the circle through the centers of the plunger means at the inner end of the body means with the circle through the centers of the plunger means at the outer end of the body means, so that the cylinder which includes the several axes of the several plunger means will have its axis precisely coinciding with the central axis of the body means, and furthermore the bearings by supporting the driving and driven rings for rotary movement serve to participate in converting the rotary motion of the driving ring into axial movement of the plunger means and the axial movement of the plunger means into rotary movement of the driven ring. With the embodiment of the invention which is illustrated in FIGS. 1, 3 and 5 the apex angle of each of the conical end portions 27 and recesses 30 is approximately 90°, while in the embodiment of FIGS. 5–7 the apex angle of each of the end portions of the plunger means and the recesses 30' is 120°. With this latter embodiment there is a smoother and easier transmission of motion accommodated by a shorter stroke for the plunger means.

It is furthermore to be noted that the inner annular surfaces of the driving and driven rings which are directed toward the plunger means are formed with annular grooves located along the circle through which the axes of the plurality of plunger means and bores of the body means pass, this circle of course being aligned with the centers of the recesses of the driving and driven rings, and the tips of the plunger means move in this groove while one recess of one of the rings 14 or 15 advances beyond the end of a plunger means so that the next following recess will reach the plunger means, and at the substantially crested portions 40 (FIG. 3) between the successive recesses of each of the rings 14 and 15 the inner annular surface is suitably rounded so that there is a smooth transition of one recess to the next as each ring 14 or 15 turns past the plurality of plunger means. The same is true of the embodiment of FIGS. 5–7, and it is to be noted that the reference to the distance between the annular surface of one of the driving or driven rings with respect to the innermost parts of the recesses of the other ring, which distance must be at least as great as the total length of the plunger means, refers to the part of the annular surface formed by the rounded crest between a pair of adjoining recesses, rather than the flat end face of each driving and driven ring which is nearest to the bores of the body means.

The pair of driving and driven rings of the embodiment of FIGS. 5–7 are formed with threaded bores 41, so that these bores can serve to fix a hand wheel to the driving ring 14' and a threaded nut to the driven ring 15', this nut threadedly surrounding a threaded spindle of the valve so that in a manner well known in the art during rotation of the driven ring 15' the threaded nut which is fixed thereto will act on the valve spindle so as to adjust the valve.

While in the specific embodiments disclosed there is either an even number of plungers cooperating with an odd number of recesses in each of the driving and driven rings, as is the case in FIGS. 1–4, or there is an even number of plungers cooperating with an even number of recesses in each of the driving and driven rings, as is the case with FIGS. 5–7, it is emphasized that there is no necessity of providing an even number of plunger means and that there may be an odd number of plunger means cooperating with an odd number of recesses in each of the driving and driven rings, or an even number of plunger means cooperating with an even number of recesses in each of the driving and driven rings, or there may be an odd number of plunger means cooperating with an even number of recesses in each of the driving and driven rings, or an even number of plunger means cooperating with an odd number of recesses in each of the driving and driven rings.

It is believed to be furthermore apparent that with the structure of the invention it is possible to provide through a hermetically sealed space which is occupied by the body means of the invention a transmission of the rotary motion having a relatively large turning moment even under conditions where a continuous operation is required, and this transmission takes place in a highly efficient smooth faultless manner with the number of plungers having with respect to the number of recesses in each of the driving and driven means a relationship which will at all times guarantee a smooth operation which is free of any tendency to tilt the driving or driven rings in an undesirable manner. Furthermore, instead of using wedge-shaped or conical configurations for the ends of the plunger means it is possible to use hemispherically-shaped elements to form the ends of the plunger means, and even when wedge-shaped or conical elements are used, the tips thereof are suitably rounded. The compact structure and simplicity of the invention make the invention suitable for a number of widely different uses and furthermore serve to maintain the costs so low that it does become commercially practical to provide a structure of the type of the present invention at installations where heretofore costs for the complex bulky known structures for accomplishing the results of the invention rendered use of such structures prohibitive.

It will be understood that each of the elements described above, or two or more together, may also find a useful application in other types of motion transmitting structures differing from the types described above.

While the invention has been illustrated and described as embodied in hermetically sealed motion transmitting structures, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Rotation transmitting structure comprising, in combination, fluid-impermeable body means having opposed inner and outer ends and adapted to be fluid-tightly fixed at least at the region of said inner end to a wall, which defines at least part of a chamber which is hermetically sealed from the outer atmosphere, with said inner end communicating through said wall with said chamber, said body means being formed with a plurality of parallel bores passing therethrough between said ends and equidistantly spaced from and distributed about a predetermined axis also passing through said body means between said ends thereof parallel to said bores; a plurality of plunger means respectively situated in and extending through said bores and each having a pair of opposed substantially pointed ends; a plurality of guide means respectively guiding said plurality of plunger means for axial movement in said bores; a driving ring supported by said body means at the region of said outer end thereof for rotation about said predetermined axis and having an annular surface directed toward said plurality of plunger means and formed with a plurality of recesses each situated at the same distance from said predetermined axis as said bores and said recesses having configurations substantially matching the substantially pointed end portions directed toward said driving ring; a driven ring supported by said body means at the region of said inner end thereof for rotation about said predetermined axis and having an annular surface directed toward said plurality of plunger means and formed with a plurality of recesses each situated at the same distance from said predetermined axis as said bores and having configurations substantially matching the substantially pointed end portions directed toward said driven ring, the distance between said annular surface of said driving ring at the parts thereof between said recesses of said driving ring and the innermost parts of said recesses of said driven ring, on the one hand, and the distance between said annular surface of said driven ring at the parts thereof between said recesses of said driven ring and the innermost parts of said recesses of said driving ring, on the other hand, being at least as great as the total length of each of said plunger means, the number of said recesses having with respect to the number of said plunger means a relationship which provides at any instant during rotation of said driving ring axial movement of at least one plunger means from said driving toward said driven ring while the ends of said one plunger means are located in one of said recesses of said driving ring and one of said recesses of said driven ring, so that said driven ring turns in response to axial movement of said one plunger means, and at the instant when the part of said annular surface of said driving ring which is situated between said one recess thereof and the next adjoining recess rides past said one plunger means at least a second plunger means having its ends situated simultaneously in a second one of said recesses of said driving ring and a second one of said recesses of said driven ring and axially advanced from said driving toward said driven ring to continue the rotation of said driven ring in response to rotation of said driving ring; and a plurality of flexible, fluid-impermeable tubular means capable of contracting and expanding longitudinally and respectively situated in said bores surrounding said plurality of plunger means with one of the ends of said plurality of tubular means respectively fixed fluid-tightly to said plurality of plunger means and the other of the ends of said plurality of tubular means respectively fixed fluid-tightly to said body means, so that the space occupied thereby is hermetically sealed.

2. Rotation transmitting structure comprising, in combination, fluid-impermeable body means having opposed inner and outer ends and formed with at least three parallel bores passing therethrough between said ends, parallel to, equidistant from and distributed about a predetermined axis passing through said body between said ends thereof; mounting means at the region of said inner end of said body means for fixedly mounting the latter at a predetermined location; at least three plunger means respectively situated in and extending through said bores and each having a pair of opposed substantially pointed ends; at least three guide means respectively guiding said plunger means for axial movement in said bores; a driving ring supported by said body means at the region of said outer end thereof for rotation about said predetermined axis and having an annular surface directed toward said plunger means and formed with substantially more than three recesses each situated at the same distance from said predetermined axis as said bores and said recesses having configurations substantially matching the substantially pointed end portions directed toward said driving ring; a driven ring supported by said body means at the region of said inner end thereof for rotation about said predetermined axis and having an annular surface directed toward said plurality of plunger means and formed with substantially more than three recesses each situated at the same distance from said predetermined axis as said bores and having configurations substantially matching the substantially pointed end portions directed toward said driven ring, the distance between said annular surface of said driving ring at the parts thereof between said recesses of said driving ring and the innermost parts of said recesses of said driven ring, on the one hand, and the distance between said annular surface of said driven ring at the parts thereof between said recesses of said driven ring and the innermost parts of said recesses of said driving ring, on the other hand, being at least as great as the total length of each of said plunger means; and at least three flexible, fluid-impermeable tubular means capable of contracting and expanding longitudinally and respectively situated in said bores surrounding said plunger means with one of the ends of said tubular means respectively fixed fluid-tightly to said plunger means and the other of the ends of said tubular means respectively fixed fluid-tightly to said body means, so that the space occupied thereby is hermetically sealed.

3. Structure for transmitting rotary motion through a hermetically sealed space, comprising, in combination, fluid-impermeable body means having opposed inner and outer ends and having a central axis extending between said ends, said body means being formed with a plurality of axial bores extending through said body means parallel to said central axis and uniformly distributed about the latter, and said body means being adapted to be fluid-tightly fixed at least at the region of its inner end to a wall which defines at least part of a chamber which is to be hermetically sealed from the outer atmosphere; a plurality of plunger means respectively situated in said bores for axial movement therein, said plurality of plunger means respectively having outwardly directed annular flanges slidably engaging said body means in said bores thereof and each of said plunger means having a pair of opposed substantially pointed ends; a plurality of guide rings respectively situated in said bores at substantial distances from said flanges and being fluid-tightly fixed to said body means in said bores thereof respectively surrounding said plurality of plunger means to cooperate with said flanges for guiding said plurality of plunger means for axial movement in said body means; a driving ring supported for rotary movement by said body means at the region of said outer end thereof, said driving ring having an axis of rotation coinciding with said central axis of said body means and said driving ring having an inner annular surface directed toward said plurality of plunger means and formed with a plurality of recesses respectively having centers distributed along a circle whose diameter equals that of a cylinder which includes the axes of said bores of said body means, said recesses respectively having configurations substantially matching the configurations of the pointed ends of said plurality of plunger means which are directed toward said driving ring; a driven ring coaxial with said driving ring and supported for rotary movement by said body means at the region of said inner end thereof, said driven ring also having an inner annular surface directed toward said plurality of plunger means and formed with a plurality of recesses respectively having centers distributed along a circle of the same diameter as said first-mentioned circle and configurations substantially matching the configurations of the pointed ends of said plurality of plunger means which are directed toward said driven ring, the distance between said inner surface of said driving ring and the innermost parts of the recesses of said driven ring as well as the distance between said inner surface of said driven ring and the innermost parts of the recesses of said driving ring being at least as great as the total length of each of said plunger means and the number of said recesses having with respect to the number of said plunger means a relationship which provides at any instant during rotation of said driving ring axial movement of at least one plunger means from said driving toward said driven ring while the ends of said one plunger means are located in one of said recesses of said driving ring and one of said recesses of said driven ring, so that said driven ring turns in the same direction as said driving ring in response to axial movement of said one plunger means by the turning driving ring from the latter toward said driven ring, and at the instant when said inner surface of said driving ring engages the end of said one plunger means adjacent said driving ring to terminate the axial movement of said one plunger means toward said driven ring, at least a second plunger means having its ends situated simultaneously in a second one of said recesses of said driving ring and a second one of said recesses of said driven ring and axially advanced from said driving toward said driven ring to continue the rotation of said driven ring in response to rotation of said driving ring; and a plurality of flexible, fluid-impermeable tubular means capable of contracting and expanding longtudinally and respectively situated in said bores surrounding said plurality of plunger means and extending respectively between said flanges and guide rings, said plurality of tubular means respectively being fluid-tightly fixed at one of their ends of said plurality of guide rings and at the other of their ends to said plurality of plunger means in the region of said flanges thereof, so that the space occupied by said body means is hermetically sealed while rotation is transmitted therethrough from said driving ring to said driven ring.

4. Structure as recited in claim 1 and wherein said plurality of tubular means are respectively formed by elongated metallic corrugated tubes respectively welded at their ends to said body means and said plurality of plunger means.

5. Structure as recited in claim 1 and wherein said ends of said plunger means are of conical configuration.

6. Structure as recited in claim 5 and wherein said conical ends of each plunger means are respectively formed from elements separate from the remainder of said plunger means and supported thereby for rotary movement about the axis thereof.

7. Structure as recited in claim 1 and wherein said ends of said plunger means are respectively in the form of elements separate from said plunger means and said elements of each plunger means being supported for free rotary movement about the axis thereof.

8. Structure as recited in claim 1 and wherein said ends of said plunger means are of wedge-shaped configuration.

9. Structure as recited in claim 1 and wherein said ends of said plunger means are rounded at their tips.

10. Structure as recited in claim 1 and wherein said ends of each of said plunger means are conical and have an apex angle of at least 90°.

11. Structure as recited in claim 1 and wherein the number of plunger means and the number of recesses in each of said driving and driven rings are even.

12. Structure as recited in claim 1 and wherein the number of said plunger means and the number of recesses of each of said driving and driven rings are odd.

13. Structure as recited in claim 1 and wherein the number of plunger means is even and the number of recesses of each of said driving and driven rings is odd.

14. Structure as recited in claim 1 and wherein the number of plunger means is odd and the number of recesses of each of said driving and driven rings is even.

References Cited by the Examiner

UNITED STATES PATENTS 2,610,525  9/1952  Sprigg _____ 74—17.8

FOREIGN PATENTS 341,053  9/1921  Germany.

FRED C. MATTERN, JR., *Primary Examiner.*

F. E. BAKER, *Assistant Examiner.*